US008508183B2

(12) United States Patent
Forsythe

(10) Patent No.: US 8,508,183 B2
(45) Date of Patent: Aug. 13, 2013

(54) SYSTEM AND METHOD FOR COMPENSATING FOR IMPEDANCE LOSS ASSOCIATED WITH AN EXTERNAL CHARGING UNIT

(75) Inventor: Lawrence Forsythe, Milton (CA)

(73) Assignee: Psion Inc., Mississauga, Ontario (CA)

( * ) Notice: Subject to any disclaimer, the term of this patent is extended or adjusted under 35 U.S.C. 154(b) by 504 days.

(21) Appl. No.: 12/766,251

(22) Filed: Apr. 23, 2010

(65) Prior Publication Data

US 2011/0260678 A1   Oct. 27, 2011

(51) Int. Cl.
*H02J 7/00*       (2006.01)
(52) U.S. Cl.
USPC .......................................... 320/107; 320/114
(58) Field of Classification Search
USPC ........................................................ 320/107
See application file for complete search history.

(56) References Cited

U.S. PATENT DOCUMENTS

| | | | | |
|---|---|---|---|---|
| 4,876,513 | A * | 10/1989 | Brilmyer et al. | 324/427 |
| 5,596,259 | A * | 1/1997 | Mino et al. | 320/157 |
| 5,646,501 | A | 7/1997 | Fishman et al. | |
| 5,963,012 | A * | 10/1999 | Garcia et al. | 320/106 |
| 6,172,481 | B1 * | 1/2001 | Curtiss | 320/127 |
| 6,553,263 | B1 | 4/2003 | Meadows et al. | |
| 7,071,655 | B2 * | 7/2006 | Murakami et al. | 320/149 |
| 7,271,568 | B2 | 9/2007 | Purdy et al. | |
| 7,435,508 | B2 | 10/2008 | Lee et al. | |
| 8,035,347 | B2 * | 10/2011 | Umetsu et al. | 320/148 |
| 8,138,723 | B2 | 3/2012 | Carkner | |
| 2002/0000788 | A1 * | 1/2002 | Ostergaard et al. | 320/128 |
| 2005/0253554 | A1 | 11/2005 | DiFazio et al. | |
| 2009/0051320 | A1 | 2/2009 | Muntermann | |
| 2009/0167312 | A1 | 7/2009 | Keates et al. | |
| 2009/0289604 | A1 | 11/2009 | Carkner | |

OTHER PUBLICATIONS

PCT International Application No. PCT/CA2011/000415 Search Report mailing date Aug. 17, 2011.
PCT International Application No. PCT/CA2011/000415 Written Opinion mailing date Aug. 17, 2011.
Non Final Office Action mailed Mar. 13, 2012 in U.S. Appl. No. 12/766,257, Lawrence Forsythe, filed Apr. 23, 2010.
Final Office Action mailed Oct. 12, 2012 in U.S. Appl. No. 12/766,257, Lawrence Forsythe, filed Apr. 23, 2010.
International Preliminary Report on Patentability for counterpart International Patent Application No. PCT/CA2011/000415 mailed Nov. 1, 2012.
Notice of Allowance for counterpart U.S. Appl. No. 12/766,257, Lawrence Forsythe, filed Apr. 23, 2010.

\* cited by examiner

*Primary Examiner* — Arun Williams

(57) ABSTRACT

There is disclosed a charging unit for charging a rechargeable battery on an external mobile device, the charging unit configured to be electrically coupled to the mobile device for electrical communication thereof, the charging unit comprising: a charging circuit comprising a charger, the charger configured to: operate in a first mode to provide a constant predefined charge current to the external battery based on an output voltage of the charger; operate in a second mode to provide a constant pre-defined charge voltage to the external battery; switch from the first mode to the second mode when the output voltage of the charger reaches a predefined threshold voltage; and an offset compensator configured for applying an offset voltage to the charger to maintain the charger in the first mode to compensate for impedance loss between the charger and the external battery thereby allowing the external battery voltage to reach the threshold voltage.

16 Claims, 4 Drawing Sheets

SYSTEM AND METHOD FOR COMPENSATING FOR IMPEDANCE LOSS ASSOCIATED WITH AN EXTERNAL CHARGING UNIT

FIELD OF THE INVENTION

The present invention relates generally to battery charging circuitry and specifically to a system and method for compensating for impedance loss associated with an external charging unit.

BACKGROUND OF THE INVENTION

Given the proliferation of handheld mobile computing devices, the size and bulkiness of the mobile device has become an important factor in enhancing their usefulness and making them more attractive for users. Also, since a user may be utilizing a number of mobile devices at one time, it is important to minimize the size of the mobile device. Therefore since space is at a premium on the handheld device, it is desirable to reduce unnecessary circuitry on the handheld device. Additionally, users are constantly desiring new features and functionality from the handheld devices which may require additional circuitry. The amount of circuitry present on the handheld device can also contribute to causing overheating of the device and may therefore be problematic.

It would therefore be advantageous for a manufacturer of handheld mobile devices to provide such a lightweight handheld device that includes minimal circuitry but does not jeopardize the performance of the device.

SUMMARY OF THE INVENTION

In accordance with an aspect of the present invention, there is provided a charging unit for charging a rechargeable battery on an external mobile device, the charging unit configured to be electrically coupled to the mobile device for electrical communication thereof, the charging unit comprising: a charging circuit comprising a charger, the charger configured to: operate in a first mode to provide a constant pre-defined charge current to the external battery based on an output voltage of the charger; operate in a second mode to provide a constant pre-defined charge voltage to the external battery; switch from the first mode to the second mode when the output voltage of the charger reaches a predefined threshold voltage; and an offset compensator configured for applying an offset voltage to the charger to maintain the charger in the first mode to compensate for impedance loss between the charger and the external battery thereby allowing the external battery voltage to reach the threshold voltage.

In accordance with a further aspect the charging circuit further comprises: a charging processor configured for: receiving pre-defined battery parameters associated with the rechargeable battery from the mobile device; determining an occurrence of a current decrease for the battery being prior to a measured battery voltage being at least at the pre-defined threshold voltage based on the pre-defined battery parameters; and providing a trigger to the offset compensator in response to the occurrence; wherein the offset compensator is configured for applying the offset voltage in response to the trigger to adjust the output voltage of the charger such as to maintain the charger in the first mode.

In accordance with yet another aspect, the offset compensator is configured to apply the offset voltage to the charger to increase the pre-defined threshold voltage to compensate for the impedance loss. In accordance with yet another aspect, the offset voltage is related to a difference between the measured battery voltage and the pre-defined threshold voltage.

In accordance with yet another aspect, the offset compensator is configured to continually apply the offset voltage to maintain the charger in the first mode until the measured battery voltage provided by the battery parameters is at least at the pre-defined threshold voltage.

In accordance with yet another aspect, there is provided a method for charging an external battery on a mobile device by a charging unit, the charging unit configured to be electrically coupled to the mobile device for electrical communication thereof, the method comprising: operating in a first mode to provide a constant pre-defined charge current to the external battery based on an output voltage of the charger; operating in a second mode to provide a constant pre-defined charge voltage to the external battery; switching from the first mode to the second mode when the output voltage of the charger reaches a predefined threshold voltage; and applying an offset voltage to the charger to maintain the charger in the first mode to compensate for impedance loss between the charger and the external battery thereby allowing the external battery voltage to reach the threshold voltage.

In accordance with yet another aspect, there method further comprises: receiving pre-defined battery parameters associated with the rechargeable battery from the mobile device; determining an occurrence of a current decrease for the battery being prior to a measured battery voltage being at least at the pre-defined threshold voltage based on the pre-defined battery parameters; and providing a trigger in response to the occurrence; applying the offset voltage in response to the trigger to adjust the output voltage of the charger such as to maintain the charger in the first mode.

In accordance with yet another aspect, the method further comprises applying the offset voltage to the charger to increase the pre-defined threshold voltage to compensate for the impedance loss.

BRIEF DESCRIPTION OF THE DRAWINGS

Embodiments of the invention will now be described by way of example only with reference to the following drawings in which.

DETAILED DESCRIPTION OF THE PREFERRED EMBODIMENTS

Figure 1:
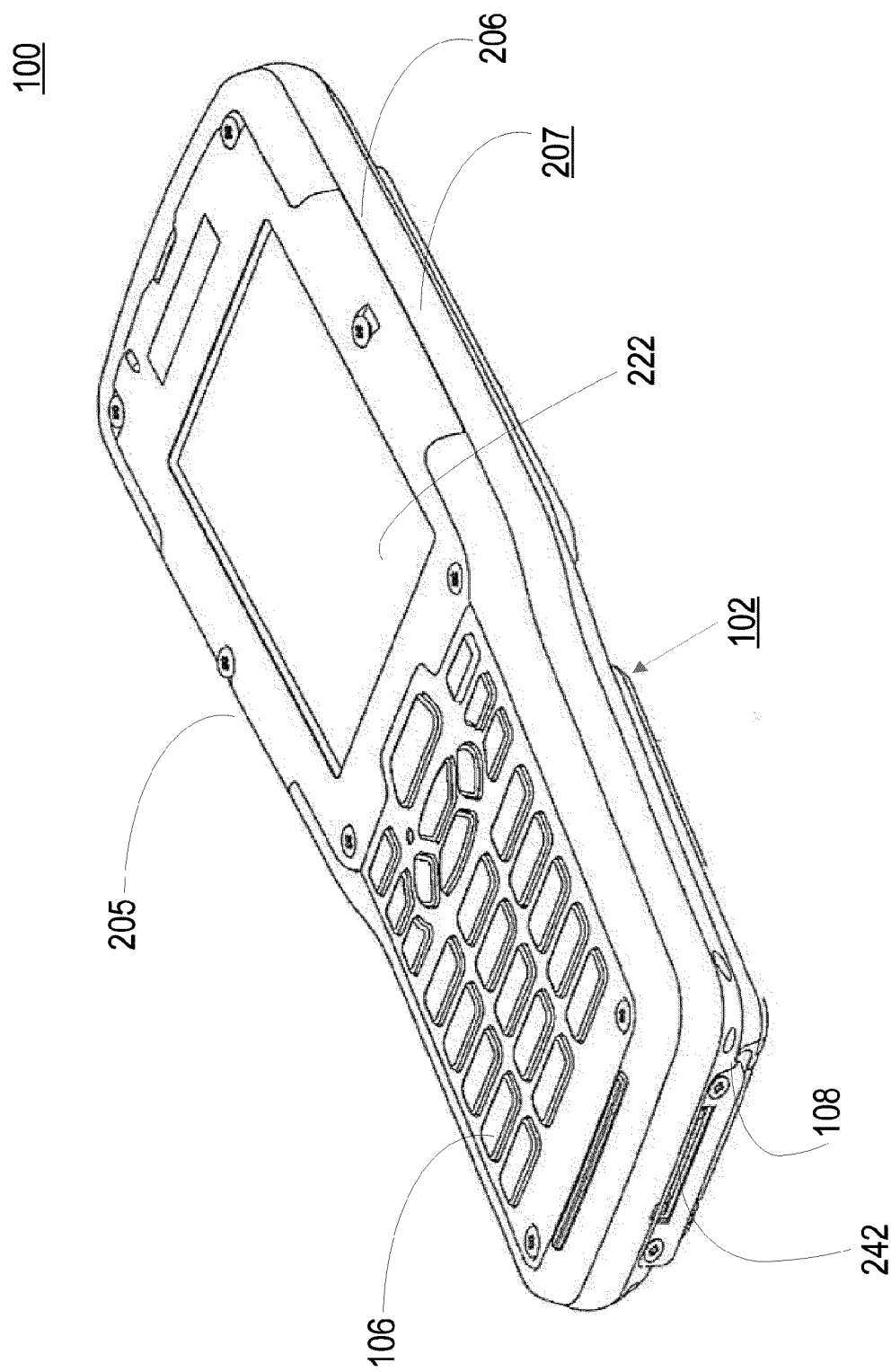
FIG. 1 is a diagram of a mobile computer according to an embodiment.

For convenience, like reference numerals in the description refer to like structures in the drawings. Referring now more particularly to the accompanying figures, FIG. 1 illustrates a mobile computer (herein referred to variously and interchangeably as a handheld device, a handheld computer, a mobile computing device or a mobile device in the disclosure herein) and is shown generally by numeral 100. The mobile computer 100 comprises a main body 102, a display 104, a keyboard module 106 and a battery compartment 108. Additionally, in the present embodiment, the mobile computer 100 has the capability of wirelessly communicating data and/or voice, to and from servers as well as data acquisition sources within a communication network. In one embodiment, the main body 102 comprises a top housing frame 205 and a bottom housing frame 206. In the embodiment shown, the top housing frame 205 may house the keyboard module 106 and the display screen 222. The bottom housing frame 206 may house the battery compartment 108 for housing a rechargeable battery (element 210 in FIG. 2). The bottom housing frame 205 further comprises a circuitry module 207 (i.e. a circuit board) for providing the electronic components required to implement at least a portion of the functionality provided by the mobile computer 100.

Figure 3:
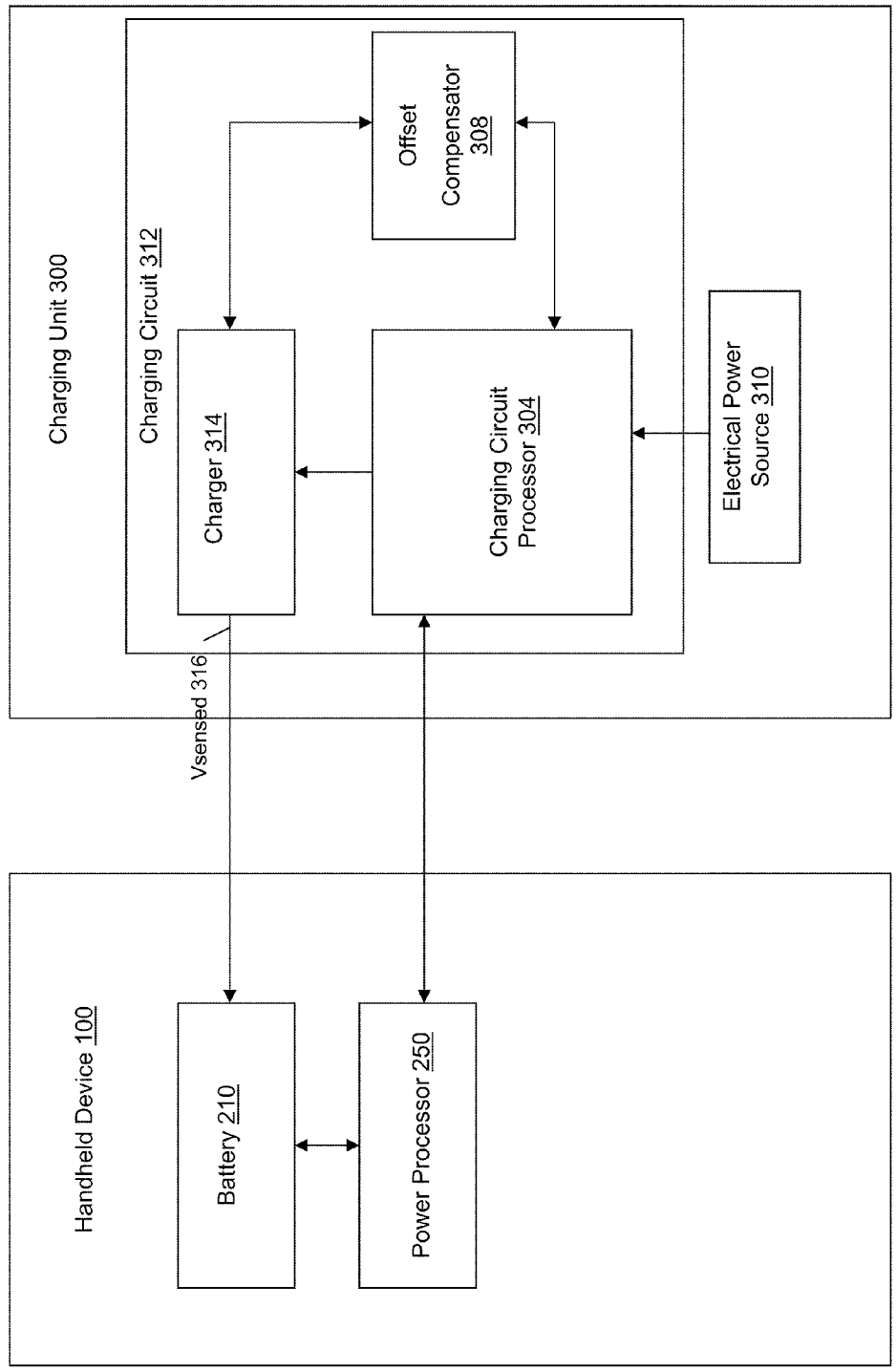
FIG. 3 is a block diagram illustrating the communication between the mobile computer and an external charging unit comprising a charging circuit for charging the battery of the mobile computer and, FIG. 4 is a block diagram illustrating an exemplary flow of operations between the charging unit and the mobile computer for charging the battery of the mobile computer.

Continuing with the embodiment depicted in exemplary manner in FIG. 1, it is noted that by housing, it is meant that a module, including battery module 210 and circuitry module 207, are substantially located or disposed within bottom housing frame 206. Circuitry module 207 may include any combination of electronic components of the handheld computer 100, such as any combination of wireless communication subsystem 211, microprocessor 238, random access memory 226 and flash memory 224. However, it will be appreciated by those of skill in the art that circuitry module 207 may not exclusively house all of the electronic components and interconnections necessary for handheld computer 100 to function as intended. According to a preferred embodiment, the circuitry module 207 is absent a computing device charging circuitry for charging the battery 210 of the computing device 100. Instead, the charging circuitry is provided on an external charging unit (an example of which is shown in FIG. 3). The external charging unit (i.e. element 300) comprises an electrical power source 310 (or is configured to be coupled to an electrical power source 310) and the charging circuitry 312. As will be described, the charging circuitry 312 monitors the voltage reading of the rechargeable battery 210 and the electrical power source 310 provides the electrical charge for charging the rechargeable battery 210 in response to the monitored voltage reading of the rechargeable battery 210.

It will be appreciated that prior handheld device architecture included the battery charging circuitry located internally on the handheld or mobile device. The handheld device would then be tethered to a power supply to charge the battery. This creates bulky handheld devices that are still in need of connection to an external power supply for charging the battery.

However, according to the preferred embodiment, the charging circuitry 312 is provided on an external device (i.e. charging unit 300 shown in FIG. 3) by removing or breaking out the charging circuitry 312 from the handheld device 100 and placing it in the charging device 300. Advantageously by providing the charging circuitry 312 on an external device (such as the charging device 300), this removes most of the heat dissipation associated with charging the battery (i.e. battery 210), and also allows for a significant reduction in area required inside of the handheld device 100 for a given charge current, thereby allowing for higher charge currents. This configuration (i.e. an example of which is shown in FIG. 3) frees up space on the handheld device 100 and removes unnecessary circuitry. As a result, the circuitry module 207 has additional space freed up for other processing circuitry to be added for the device. Further, since the charging circuitry 312 is located on the charging unit 300, the battery compartment 108 may accommodate different types of rechargeable batteries 210, as long as the charging unit 300 and the rechargeable battery 210 are compatible with each other. That is, by providing a charging unit 300 with a charging circuit 312 that is compatible with a selected rechargeable battery 210, the selected rechargeable battery 210 may be used within the handheld device 100.

In one aspect, the battery compartment 108 may be sized and electrically configured to accommodate a number of different rechargeable batteries 210 compatible with the charging unit 300. The number of different rechargeable batteries 210 being at least two different types. For example, the battery compartment 108 may be adjustably sized to receive different sized batteries 210. In one aspect, the battery compartment 108 being electrically configured to accommodate a number of different batteries 210 implies that a number of electrical contacts are provided in the battery compartments 108 for accommodating the different batteries 210.

In one embodiment, the bottom housing frame 206 may completely, or partially, house a connector slot 242 whereby an external charging unit (i.e. charging unit 300) may be electrically coupled (i.e. via a connector) to the electrical contacts of the rechargeable battery 210 of battery compartment 108.

Figure 2:
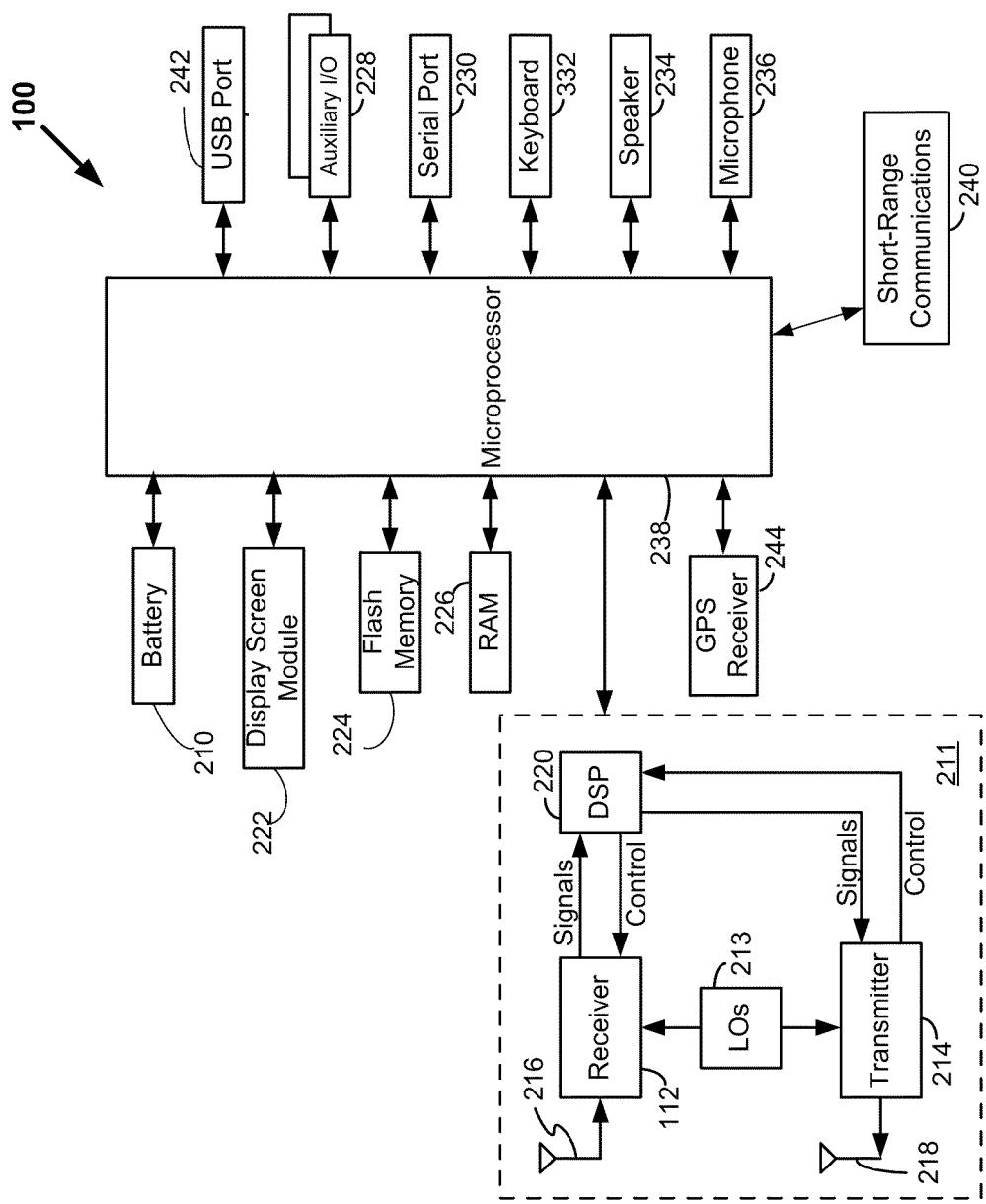
FIG. 2 is a block diagram illustrating the functionality provided by the mobile computer.

Referring to FIG. 2, a block diagram illustrating an example of the functionality provided by the device 100 is shown generally by number 200. The circuitry module 207 includes a microprocessor 238, which controls general operation of the mobile computer 100. The microprocessor 238 also interacts with functional device subsystems such as a communication subsystem 211, the display module 222, a flash memory 224, random access memory (RAM) 226, auxiliary input/output (I/O) subsystems 228, serial port 230, keyboard 232, speaker 234, microphone 236, short-range communications subsystem 240 such as Bluetooth™ for example, and Universal Serial Bus (USB) expansion port 242 for peripherals. The mobile computer 100 may include a power source 210, such as a rechargeable battery 210 which may also be removable and replaceable from the mobile computer 100. The mobile computer 100 may also include a positioning device 244, such as a GPS receiver for example, for receiving positioning information.

Operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on the mobile computer 100. A predetermined set of applications, which control basic device operations, may be installed on the mobile computer 100 during its manufacture. These basic operations typically include data and voice communication applications, for example. Additionally, applications may also be subsequently loaded onto the handheld device 100 through the communication subsystem 211, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of the handheld device 100 and may provide enhanced on-device features, communication-related features, or both.

The radio frequency (RF) communication subsystem 211, includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the RF communication subsystem 211 depends on the communication network in which mobile computer 100 is intended to operate, but may include communication functionalities such as radio-frequency identification (RFID), Wi-Fi WLAN based on 802.11 standards, and the like.

The display module 222 is used to visually present an application's graphical user interface (GUI) to the user via a display screen. The display screen module 222 may employ a touch screen display, in which case the user can manipulate application data by modifying information on the GUI using direct touches by finger. Depending on the type of mobile computer 100, the user may have access to various types of input devices, such as, for example, a scroll wheel, trackball, light pen and/or a touch sensitive screen.

In the present embodiment, the circuit board 207 may be mounted onto a metal frame in order to be attached to the main body 102 of the mobile computer 100.

Generally speaking a battery charging circuit is configured to deliver a constant current until a threshold voltage is reached at the rechargeable battery. This is referred to as constant current charging. Once the desired threshold voltage is reached, the charging circuit charges the battery by providing a constant voltage. The constant voltage is provided to the rechargeable battery until the current decreases.

According to a preferred embodiment illustrated in FIG. 3, by providing an external charging unit (element 300) that provides the charging circuit (element 312), the external mechanical connections (i.e. pogo pins, flex connectors, etc.) associated with the charging circuit 312 provide an impedance loss across which a voltage drop occurs. In this way, the voltage seen by the charging unit 300 (as provided by the charger 314—i.e. Vsensed 316) to charge the battery 210 across the charge path is higher than the voltage received at the battery 210 since the impedances of the various connectors etc. along the charge path between the charger 314 and the battery 210 cause a voltage drop to occur. In addition, other impedances may be seen as a result of connectors (i.e. one or more connectors between the device 100 and the charging unit 300) and other components in the path between the charging circuit 312 and the device 100. Due to this voltage drop, the voltage provided to the device 100 (i.e. the battery 210) is less than the desired voltage (also referred to as a threshold voltage) for charging the battery 210. Accordingly, in order for the desired threshold voltage to be provided to the battery 210 such that the battery voltage 210 reaches the threshold voltage, a compensation mechanism is provided by the charging unit 300. That is, the voltage at the battery 210 is measured as shown in FIG. 3 (via a power processor 250) and fed back to the charging circuit 312 of the charging unit 300 for providing adjustment of the voltage such as to cause the charger 314 to provide a higher voltage such that the voltage drop across the charge path will still allow the battery 210 to reach the threshold voltage. According to an alternate embodiment discussed below, the threshold voltage of the charger may be modified to a higher threshold voltage such that the charger 314 provides a constant current until the higher threshold voltage is reached, thereby allowing the battery 210 to reach the desired threshold voltage. As will be understood, a safety mechanism may be incorporated in the charger 314 such as to allow the threshold voltage to be changed to a maximum threshold voltage to prevent overheating or other issues with the charger.

Referring now in detail to FIG. 3, shown is an architecture of the charging unit 300 having circuitry for compensating for the impedance loss associated with external charging circuitry 312 being located external to device 100 and battery 210. The charging unit 300 comprises a charging circuit 312, and an electrical power source 310. The charging circuit 312 comprises a charging circuit processor 304, an offset compensator 308, and a charger 314. The charging unit 300 is electrically coupled to the handheld device 100 and the battery 210. The electrical connection may be via the connector port 242 which is adapted to receive or secure a connector for coupling the external charging unit 300 to the electrical contacts of the rechargeable battery 210.

The charger 314 may thus be configured for providing a constant charge current in a first mode of operation (i.e. to the device 100). In this first mode of operation, the charger 314 is configured for providing the constant charge current and operating in the first mode of operation until the sensed output voltage (Vsensed 316) of the charger 314 reaches the predetermined threshold voltage that is desired for charging the battery 210. Once the charger 314 determines that the sensed output voltage 316 is approximately equivalent to or greater than the threshold voltage, the charger 314 is configured to operate in a second mode of operation and provide a constant charge voltage until the charge current decreases. As will be described with respect to FIG. 3, the charging processor 304 and the offset compensator 308 are configured for cooperatively causing the charger 314 to remain in the first mode of operation for a longer period of time (i.e. even after the sensed output voltage 316 first reaches the threshold voltage) such as to allow the battery 210 voltage to reach the desired threshold voltage value thereby compensating for any impedance losses across the charge path.

Continuing with the embodiment depicted in FIG. 3, the power processor 250 on the handheld device 100 is configured to measure battery 210 parameters comprising at least one of the voltage value and the current value of the battery 210 and provide at least one of the detected battery voltage value and the current value to the charging circuit processor 304. The power processor 250 may further be configured to measure other battery 210 parameters comprising any one of the battery voltage, battery charge current, capacitance, temperature and other charge parameters for monitoring the charging activity of the battery 210. The power processor 250 is further configured to provide the battery parameters to the charging circuit processor 304 across a digital communication path. In one aspect, the charging circuit processor 304 may be configured to poll the power processor 250 for receiving the battery parameters thereafter. In another aspect, the power processor 250 may be configured to provide the battery 210 parameters at certain intervals and/or upon detection of pre-determined criteria that may trigger the battery 210 parameters to be provide to the charging processor 304.

The charging circuit processor 304 is configured to monitor the current drop of the battery 210 as provided by the power processor 250. If a current drop is detected, this indicates that the charger 314 is operating in a second mode of operation and that the sensed output voltage 316 of the charger has reached the threshold voltage value. If the current drop is realized before the battery 210 attains the desired threshold voltage value (i.e. the measured battery voltage value as provided by the power processor 250 is less than the desired threshold voltage value), then the charging circuit processor 304 is configured to provide a control signal or a trigger to the offset compensator 308 for triggering compensation for the impedance loss. That is, the offset compensator 308 upon receiving the control signal is configured to apply an offset voltage to the charger 314. Specifically, the offset compensator 308 decreases the sensed output voltage 316 of the charger 314 such that it is below the threshold voltage to cause the charger 314 to remain or revert to the first mode of operation. In this manner the charging processor 304 continually monitors the battery voltage and battery current to determine when the battery 210 has reached the desired threshold value. If the battery 210 has not reached the threshold voltage value yet then the charging processor 304 and offset compensator 308 continually apply an offset voltage to the sensed output voltage 316 of the charger 314 such as to allow the battery 210 to be charged up to the desired threshold value. That is, if a current drop occurs before the measured battery 210 voltage value provided by the power processor 250 is at least equivalent to the pre-defined threshold value then an offset voltage is applied by the offset compensator 308. In one aspect, the offset voltage value applied to the output voltage of the charger 314 (i.e. 316) is approximately the difference between the measured battery 210 voltage value and the pre-defined threshold value. In this manner the sensed output voltage 316 of the charger 314 is modified by the offset compensator 308 so that the charger sensed output voltage 316 is a more accurate reflection of the voltage of the battery 210.

Accordingly, the charger 314 is configured to continue providing a constant current (first mode of operation) to the battery 210 until the battery 210 reaches the pre-defined threshold voltage value (as detected by the power processor 250 and communicated to the charging processor 304). The charging unit 300 is configured to compensate for the difference between the voltage reading of the charging circuitry 312 and the battery 210. Once the threshold voltage is reached at the battery 210 (as determined by the power processor 250), the charging circuit processor 304 is configured to deliver a constant voltage to the battery 210 until the battery 210 charge current decreases. In this way, the desired threshold voltage is provided and reached at the battery 210.

Referring to FIG. 3, by placing the charging circuit 312 external to the device 100, this allows flexibility with the device 100 such as to allow a variety of batteries 210 (i.e. of different types and/or charging capacities) to be used in the handheld device 100 as long as they are compatible with the charging circuit 312. Accordingly, this enhances the practicality and economics of replacing the battery 210.

Figure 4:
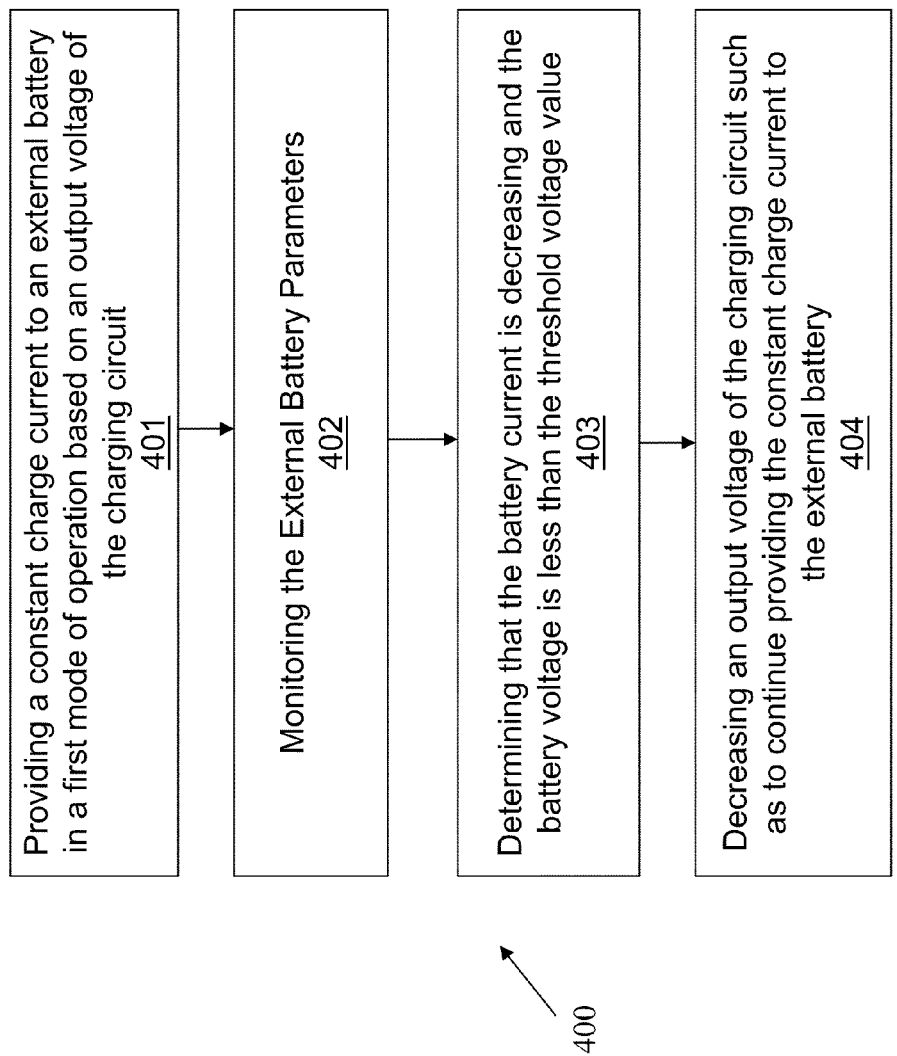

Referring to FIG. 4 shown is an exemplary flow of operations 400 for the charging unit 300 and the charging circuitry 312 for compensating for the impedance loss that occurs in the path between the charging circuitry 312 and the battery 210 being charged. At step 401, the charger 314 provides a constant charge current to an external battery 210 in a first mode of operation based on an output voltage (i.e. Vsensed 316) of the charging circuit 312. At step 402, the charging processor 304 is configured to receive external battery 210 parameters (such as battery voltage, current, capacitance, temperature). Based on the received battery parameters, the charging processor 304 is configured to determine that the charging circuit is entered into a second mode of operation (that is where the charger 314 senses that the threshold voltage is reached by the sensed output voltage 316) and thus provides a constant predefined voltage to the battery 210 until the current provided to the battery 210 decreases. In one embodiment, at step 403, based on the battery parameters, the charging processor 304 determines that the battery 210 current is decreasing (indicative that the charging unit 300 has entered the second mode or constant voltage mode of operation). At step 403, the charging processor 304 also determines that the battery 210 voltage is less than the desired threshold value. At step 404, the charging processor send a control signal to the offset compensator 308 to initiate or trigger the start or the continuation of applying an offset to the output sensed voltage 316 of the charger 314. Accordingly, at step 404, the offset compensator 308 applies an offset to decrease the output voltage 316 of the charger such as to cause the charger 314 to continue providing the constant charge current to the battery 210 (i.e. remain longer in a first mode of operation). According to one embodiment, the offset compensator 308 may be configured to continue providing an offset voltage to the output sensed voltage 316 until the offset compensator 308 receives an indication (i.e. via the charging processor 304) that the battery 210 voltage has reached the desired threshold voltage value.

According to a further embodiment, the offset applied by the offset compensator 308 is further dependent upon the sensed output charging current as sensed going out of the charger 314. Accordingly, the charging circuit 312 may further be configured to sense the output current coming out of the charger 314. Accordingly, the amount of offset voltage applied may be further proportional to the output current of the charger 314. In this way, as the charger 314 current decreases, the offset also decreases. This provides an additional safety measure as the current through the charging path (between the charger 314 and the battery 210) decreases, the voltage drop across the path also decreases and hence the amount of offset needed decreases. This safety measure is in place to provide protection if the charge processor 304 is inoperable for any reason, making it unavailable to make offset tweaks as the battery 210 voltage rises and the charging current decreases as a result of the rising battery 210 voltage. In the present embodiment, the offset voltage is in dependence upon a charging current going out of the charger and the setting of the offset compensator 308 (i.e. the difference between the battery voltage value and the threshold voltage) as controlled by the charge processor 304.

As described above, the charger 314 is configured to operate in two modes of operation. That is, in a first mode the charger 314 provides a constant pre-defined charge current to the external battery 210 based on an output voltage 316 of the charger 314; and in a second mode provide a constant pre-defined charge voltage to the external battery 210. In one embodiment, the charger 314 is configured to switch from the first mode to the second mode when the output voltage of the charger 314 reaches a predefined threshold voltage. Preferably, the offset compensator 308 is configured for applying an offset voltage to the charger 314 to maintain the charger in the first mode to compensate for impedance loss between the charger 314 and the external battery 210 thereby allowing the external battery voltage 210 to reach the threshold voltage. As described above, the offset voltage applied by the charger 314 may be in dependence upon the charging circuit processor 304, and the power processor 250 determining that the battery 210 has not reached the desired threshold voltage but the current of the battery 210 is dropping (indicative of the charger 314 operating in the second mode). Accordingly, the charging circuit processor 304 communicates with the offset compensator 308 to cause the applying of an offset voltage to the output voltage 316 of the charger 314. In another embodiment, once the charging circuit processor 304 determines that the charger 314 is operating in the second mode of operation but that the battery 210 has not reached the threshold voltage (based on the battery parameters), the offset compensator 308 applies an offset to the threshold voltage of the charger 314 (i.e. to increase the threshold voltage of the charger by a pre-defined amount such as to compensate for the impedance loss across the communication path between the charger 314 and the battery 210). In this way, the charger 314 does not switch to the second mode of operation until the increased threshold voltage is reached such as to allow the external battery 210 to reach the desired threshold voltage at the battery.

Although the specific implementations of the invention are described above, a person of ordinary skill in the art will appreciate that various modifications can be made without detracting from the spirit of the invention.

Although a mobile or handheld computer has been used to establish a context for disclosure herein, it is contemplated as having much wider applicability within the field of handheld devices. Furthermore, the disclosure herein has been described with reference to specific exemplary embodiments; however, varying modifications thereof will be apparent to those skilled in the art without departing from the scope of the invention as defined by the appended claims.

Therefore, although the invention has been described with reference to certain specific embodiments, various modifications thereof will be apparent to those skilled in the art without departing from the scope of the invention as defined by the appended claims.

What is claimed is:

1. A charging unit for charging a rechargeable battery on an external mobile device, the charging unit configured to be electrically coupled to the mobile device for electrical communication thereof, the charging unit comprising:
    a charging circuit comprising a charger, the charger configured to:
        operate in a first mode to provide a constant pre-defined charge current to the external battery based on an output voltage of the charger;
        operate in a second mode to provide a constant pre-defined charge voltage to the external battery;
        switch from the first mode to the second mode when the output voltage of the charger reaches a predefined threshold voltage;
    an offset compensator configured to apply an offset voltage to the charger to maintain the charger in the first mode to compensate for impedance loss between the charger and the external battery; and
    a charging processor configured to:
        receive pre-defined battery parameters associated with the rechargeable battery from the mobile device;
        determine an occurrence of a current decrease for the battery being prior to a measured battery voltage being at least at the pre-defined threshold voltage based on the pre-defined battery parameters; and
        provide a trigger to the offset compensator in response to the occurrence;
    wherein the offset compensator is configured to apply the offset voltage in response to the trigger to adjust the output voltage of the charger such as to maintain the charger in the first mode.

2. The charging unit of claim 1, wherein the offset compensator is configured to apply the offset voltage to the charger to increase the pre-defined threshold voltage to compensate for the impedance loss.

3. The charging unit of claim 2 wherein the offset voltage is further related to an output charge current of the charging circuit.

4. The charging unit of claim 1, wherein the offset voltage is related to a difference between the measured battery voltage and the pre-defined threshold voltage.

5. The charging unit of claim 1, wherein the offset compensator is configured to continually apply the offset voltage to maintain the charger in the first mode until the measured battery voltage provided by the battery parameters is at least at the pre-defined threshold voltage.

6. The charging unit of claim 1, wherein the charging processor is configured to poll a power processor of the mobile device across a digital communication path for receiving battery parameters in response to the polling.

7. The charging unit of claim 1 further comprising an electrical power source for providing an electrical power charge to the charging circuit for propagation to the rechargeable battery.

8. The charging unit of claim 7 further comprising a connector configured for electrically coupling the charging circuit and the electrical power source to electrical contacts of the rechargeable battery.

9. The charging unit of claim 1, wherein the offset voltage is a difference value between the measured battery voltage and the output voltage of the charger.

10. A method for charging an external battery on a mobile device by a charging unit, the charging unit configured to be electrically coupled to the mobile device for electrical communication thereof, the method comprising:
    operating in a first mode to provide a constant pre-defined charge current to the external battery based on an output voltage of the charger;
    receiving pre-defined battery parameters associated with the external battery from the mobile device;
    determining an occurrence of a current decrease for the external battery being prior to a measured battery voltage being at least at a pre-defined threshold voltage based on the pre-defined battery parameters;
    providing a trigger in response to the occurrence;
    applying an offset voltage to adjust the output voltage of the charger in response to the trigger in order to maintain the charger in the first mode and to compensate for impedance loss between the charger and the external battery;
    operating in a second mode to provide a constant pre-defined charge voltage to the external battery;
    switching from the first mode to the second mode when the output voltage of the charger reaches the predefined threshold voltage.

11. The method of claim 10 further comprising applying the offset voltage to the charger to increase the pre-defined threshold voltage to compensate for the impedance loss.

12. The method of claim 10, wherein the offset voltage is related to a difference between the measured battery voltage and the pre-defined threshold voltage.

13. The method of claim 10, further comprising continually applying the offset voltage to maintain the charger in the first mode until the measured battery voltage provided by the battery parameters is at least at the pre-defined threshold voltage.

14. The method of claim 13 wherein the offset voltage is further related to an output charge current of the charging circuit.

15. The method of claim 10, further comprising polling a power processor of the mobile device across a digital communication path for receiving battery parameters in response to the polling.

16. The method of claim 10 wherein the offset voltage is a difference value between the measured battery voltage and the output voltage of the charger.

* * * * *